United States Patent Office 2,760,877
Patented Aug. 28, 1956

2,760,877

SEALING COMPOSITION AND A PROCESS OF MAKING IT

Foster J. Castner, Somerville, N. J., assignor to Johns-Manville Corporation, New York, N. Y., a corporation of New York No Drawing. Application May 22, 1952,
Serial No. 289,423

6 Claims. (Cl. 106—244)

This invention relates to a new sealing composition capable of extrusion application and having excellent non-slumping characteristics.

Various sealing compositions containing hydroxylated fatty oils have been heretofore proposed having consistencies enabling their application by extrusion, such as by a caulking gun, etc. These compositions, having sufficiently low viscosity to enable such as extrusion application, have commonly suffered the serious disadvantage of relatively poor resistance against slumping or running after application. This disadvantageous characteristic of slumping is due to the relatively low yield strength of the material formed with the low viscosity required for extrusion application. It has been commonly found that the desirable decrease in viscosity of the sealant composition has inherently associated with it the undesirable characteristic of low yield strength.

Accordingly, it is an object of this invention to provide a sealing composition which has a relatively low viscosity allowing its easy application with conventional caulking guns and the like, and yet a high yield strength giving it good resistance against slumping or running after application.

It is an additional object of this invention to provide a sealing composition which has excellent resistance to slumping at soft consistencies and also substantial resistance to aging and corrosive materials such as brine, etc.

It is a further and more specific object of this invention to provide a sealant composition having the above-entitled characteristics, which will not soften natural rubber and which is non-injurious to the skin of workmen applicators.

Another object is a method of manufacture hereinafter described and more particularly defined in the appended claims.

The sealing composition according to this invention generally comprises a hydroxylated fatty oil, an inert filler, and a relatively small amount of a stiffener comprising a dicarboxylic acid or anhydride. Since the composition is particularly adapted for application by extrusion, as, for example, with a conventional caulking gun, the sealant as compounded should have a consistency such as to give a penetration of from approximately 10 to 40, and preferably approximately 15 to 25 mm., under A. S. T. M. standard test conditions utilizing a modified conical needle, but should not slump or run from the place to which it is applied, regardless of temperatures.

The hydroxylated fatty oil utilized in the base vehicle for the sealing composition formed in accordance with this invention is preferably castor oil which may be employed in either the raw state or in a blown condition. Any suitable conventional inert filler materials such as asbestos fiber, talc, silica, whiting, etc., may be utilized. If these two elements of the combination are compounded to form, by themselves, a sealing composition, a material having a desirable low viscosity may be obtained, but the material will exhibit a relatively high degree of slumping or running after application.

As heretofore indicated, the sealing composition of this invention has a relatively low viscosity which is comparable to that obtained by mixing the oil and inert filler, but it is also characterized by a relatively high yield strength which prevents the material from slumping or running from the position to which it is applied. It has been found that the addition of a relatively small amount of a stiffener comprising a dicarboxylic acid or anhydride to the sealing composition containing a hydroxylated fatty oil enables the formation of a high yield strength material without substantial increase in its desirable low viscosity.

The dicarboxylic acid or anhydride utilized in accordance with the invention may comprise a saturated and unsaturated aliphatic dicarboxylic acid or anhydride preferably containing up to 10 carbon atoms, such as succinic acid, succinic anhydride, maleic acid, maleic anhydride, adipic acid, sebacic acid, etc.; a saturated and unsaturated alicyclic dicarboxylic acid or anhydride such as cyclohexane dicarboxylic acid, carbic anhydride, etc.; an aryl dicarboxylic acid or anhydride, such as phthalic acid, phthalic anhydride; or an alkylaryl dicarboxylic acid or anhydride such as butyl phthalic acid, di-ethyl phthalic anhydride, phenylene diacetic acid, etc.

While such dicarboxylic acids have been found suitable for use in this invention, it has been found that hydroxyl substituents in the molecules of these acids, or at least in those having relatively short carbon chains, apparently destroy those characteristics of the acid which result in the new and unexpected properties of the sealing composition. For example, malic acid or malic anhydride, when used as the dicarboxylic acid substituent, results in a relatively low viscosity material which also has the undesirable characteristic of a low yield strength. The new and unexpected low viscosity but high yield strength properties of the sealing composition of this invention are not obtained in a mixture employing malic acid.

The method of manufacturing the sealing compositions of this invention comprises forming a base vehicle by heating the hydroxylated fatty oil, such as castor oil, to a temperature above approximately 100° F., but not over approximately 250° F., and dissolving therein the dicarboxylic acid or anhydride in amount at least 0.2% by weight of the fatty oil. The maximum amount of dicarboxylic acid or anhydride capable of use in this invention for the purpose herein defined is limited only by the amount capable of being dissolved in the heated hydroxylated fatty oil. While acid or anhydride in excess of the amount capable of being dissolved may be utilized without destroying the properties of the sealing composition of this invention, such an excess does not result in any added beneficial properties in the composition, and hence, for economical reasons, would not be used.

While not limiting this invention to any particular theory, it is apparent that an esterification reaction does not take place during the aforementioned procedure since it has been found that the mixing procedure must be carried out at temperatures substantially less than those used in conventional esterification reactions, i. e., 400° F. As hereinbefore indicated, the temperature of the mixture should not exceed 250° F., either during the preparation of the base material or of the total sealing composition.

After the base material incorporating the hydroxylated fatty oil and the dicarboxylic acid has been prepared and thoroughly mixed, the inert filler material, such as a mixture of asbestos fiber and talc, is added, and the thus formed composition is mixed to obtain a uniform dispersion of the filler throughout the base vehicle. The amount of inert filler added to the oil base mixture depends only upon the consistency desired in the final sealing composition and preferably comprises approximately 25 to 75% by weight of the total sealing compound.

The following is an example of a sealing composition according to this invention and its general method of preparation. It is understood, of course, that the composition of and method for producing this sealing composition are exemplary and are not to be considered to limit the invention to the particular composition and operating conditions outlined.

A base material is formed by heating castor oil to a temperature between 160° and 200° F. and dissolving therein acid phthalic anhydride in amount approximately 1% by weight of the oil. To 45 parts of the thus formed oil base mixture at the temperature of 160–200° F. is then added approximately 35 parts of asbestos fiber shorts and approximately 20 parts of talc, with sufficient mixing to form a uniform dispersion of ingredients. The thus formed sealing composition has a gray-green color, a penetration of approximately 16 mm. rendering it suitable for extrusion application, and excellent resistance to slumping or running from the position to which it is applied. It also has excellent resistance to corrosive materials such as brine and to aging and skinning, and does not have a detrimental effect on natural rubber products.

The low viscosity, high yield strength sealing composition formed in accordance with this invention also exhibits a phenomenon which is advantageous to the composition after it is in its position for a substantial length of time. The high yield strength of the material apparently somewhat diminishes after the composition has been in use for a relatively long period of time, causing a softening of the sealing composition. This softening is overcome, however, by the natural hardening of the composition due to aging, and the resultant balancing of the softening effect and natural age hardening tends to allow the sealing composition to retain substantially the same consistency and characteristics after aging as it has when initially applied. This phenomenon of softening with length of time is also a rather definite indication that an esterification reaction does not take place during the initial mixing of the hydroxylated fatty oil and dicarboxylic acid.

It will be understood that the details given herein are for the purpose of illustration, not restriction, and that variations within the spirit of the invention are intended to be included in the scope of the appended claims.

What I claim is:

1. A sealing composition having a high yield strength comprising approximately 25 to 75% by weight of an inert filler and a product formed by heating together castor oil and an effective amount which is from at least 0.2% by weight of said oil up to the maximum capable of being dissolved in said oil of a high yield strength imparting stiffener selected from one of a group consisting of saturated and unsaturated dicarboxylic acids and anhydrides thereof having up to 12 carbon atoms and only carbon, hydrogen, and oxygen.

2. A sealing composition having a high yield strength comprising approximately 25 to 75% by weight of an inert filler and a product formed by heating together castor oil and an effective amount which is from at least 0.2% by weight of said oil up to the maximum capable of being dissolved in said oil of an aryl dicarboxylic acid anhydride.

3. A sealing composition having a high yield strength comprising approximately 25 to 75% by weight of an inert filler and a product formed by heating together castor oil and an effective amount which is from at least 0.2% by weight of said oil up to the maximum capable of being dissolved in said oil of phthalic anhydride.

4. A method of manufacturing a sealing compound having a high yield strength, which comprises forming a base vehicle by heating castor oil to a temperature of approximately 100° to 250° F., dissolving therein an effective amount which is from at least 0.2% by weight of said oil up to the maximum capable of being dissolved in said oil of a high yield strength imparting stiffener selected from one of a group consisting of saturated and unsaturated dicarboxylic acids and anhydrides thereof having up to 12 carbon atoms and only carbon, hydrogen, and oxygen, and dispersing in the thus formed base vehicle inert filler materials in amount sufficient to form approximately 25 to 75% by weight of the sealing compound.

5. The method of manufacturing a sealing compound having high yield strength, which comprises forming a base vehicle by heating castor oil to a temperature of approximately 100° to 250° F., dissolving therein an effective amount which is from at least 0.2% by weight of said oil up to the maximum capable of being dissolved in said oil of an aryl dicarboxylic acid anhydride, and dispersing in the thus formed base vehicle inert filler materials in amount sufficient to form approximately 25 to 75% by weight of the sealing compound.

6. The method of manufacturing a sealing compound having high yield strength, which comprises forming a base vehicle by heating castor oil to a temperature of approximately 100° to 250° F., dissolving therein an effective amount which is from at least 0.2% by weight of said oil to the maximum capable of being dissolved in said oil of phthalic anhydride, and dispersing in the thus formed base vehicle inert filler materials in amount sufficient to form approximately 25 to 75% by weight of the sealing compound.

References Cited in the file of this patent

UNITED STATES PATENTS

| | | |
|---|---|---|
| 1,906,749 | Grant | May 2, 1933 |
| 2,298,914 | Auer | Oct. 13, 1942 |
| 2,396,763 | Ullman | Mar. 19, 1946 |
| 2,567,404 | Ramsey | Sept. 11, 1951 |
| 2,567,409 | Trent | Sept. 11, 1951 |